United States Patent

[11] 3,567,954

[72] Inventors Tsuneo Mitsui;
 Muneyuki Udo, Tokyo, Japan
[21] Appl. No. 852,821
[22] Filed Aug. 25, 1969
[45] Patented Mar. 2, 1971
[73] Assignees Tokyo Electric Power Co., Inc.
 Toyko, Japan;
 Tokyo Shibaura Electric Co., Ltd.
 Kawasaki-shi, Japan
[32] Priority Aug. 28, 1968
[33] Japan
[31] 43/61270 and 43/61269

[54] INTERCONNECTING MEANS FOR ELECTRIC POWER SYSTEMS
4 Claims, 4 Drawing Figs.

[52] U.S. Cl. ........................................... 307/20,
 307/43, 317/26
[51] Int. Cl. ........................................ B62d 55/14
[50] Field of Search ........................................ 317/26;
 307/51, 54, 55, 77, 71, 88, 43, 63, 69, 72, 76, 19,
 20, 64, 70, 80; 323/70, 82, 101, 102, 105, 125,
 127, 129, (Inquired)

[56] References Cited
UNITED STATES PATENTS
1,821,935 9/1931 Finch ........................... 307/51
1,939,145 12/1933 Sittinger ....................... 307/20X FOREIGN PATENTS
431,949 7/1935 Great Britain ................ 307/20

Primary Examiner—William M. Shoop, Jr.
Assistant Examiner—Ulysses Weldon
Attorney—Flynn & Frishauf ABSTRACT: An interconnecting means for AC electric power systems is composed of a plurality of DC excited saturable reactors located within a tie line connecting said electric power systems. These DC excited saturable reactors are arranged between the corresponding phase lines, as well as between the different phase lines, of the tie line. Thus in the normal state where there is little phase difference between the interconnected power systems, only the reactors disposed between the corresponding phase lines are reduced in impedance by regulating their DC excitation so as to allow sufficient power to flow therethrough. But under the stepout condition between said power systems, all the saturable reactors are controlled in DC excitation to have their impedance reduced in turn according to the degree of the phase difference between said interconnected power systems, whereby the tie line power flows across those phase lines of the tie line which have the smallest phase difference.

INTERCONNECTING MEANS FOR ELECTRIC POWER SYSTEMS

The present invention relates to improvements in an interconnecting means for electric power systems interposed therebetween for supplying a tie line power under control from one of said systems to the other.

Where two power systems are joined together by a tie line, there is provided an interconnecting means in the tie line in order to supply a tie line power across said systems. Even in case one of said systems fails or a power source breaks down, the present invention enables a tie line power to be supplied to the failing system from the normal one, thereby maintaining the stability of the former. There are demanded of this interconnecting means the various properties listed below.

1. It has a low impedance in normal power supply and is little subject to active and reactive power loss.
2. In case failure originates with shorting, it can effectively suppress a short circuit current from one power system to the other.
3. When one system lacks power due to practically no power supply from a source, it allows the other normal system to supply a backup power to the first mentioned system to maintain its prescribed frequency. Further, in such case, it can restrict the maximum amount of said backup supply within a reasonable bound so as to prevent the normal system from becoming inoperable due to undue backup supply.
4. Even where one of said systems presents severe power shortage with the resultant stepout, it can supply said system with a certain amount of backup power from the other.
5. When failure leads to fluctuations in power supply, it can minimize the resultant disturbance to the best possible extent.

The known interconnecting means include a DC transmission link comprising a rectifier and inverter and an AC transmission link comprising a plurality of variable reactors disposed only between the corresponding phase lines of a tie line connecting both power systems. However, the prior art devices had the drawbacks that they could not meet all the above-mentioned properties from item (1) to item (5), namely, lacked some of them or in some cases became very costly.

It is accordingly the object of the present invention to eliminate the aforementioned shortcomings encountered with the prior art and provide an interconnecting means for power systems to fulfill all the above-listed requirements.

In accordance with the invention, there are disposed a plurality of variable reactors between the corresponding phase lines, as well as between the different phase lines, of a tie line connecting electric power systems. In the normal state where there is little phase difference between the power systems, only the variable reactors connected between the corresponding phase lines of the tie line are so reduced in impedance as to allow sufficient tie line power to pass therethrough, while when a stepout occurs between said power systems said reactors are induced in turn in impedance according to the phase rotation between said power systems, whereby a tie line power flows across those phase line of the tie line which have the smallest phase difference.

The present invention can be more fully understood from the following detailed description when taken in connection with reference to the accompanying drawings, in which.

Figure 1:
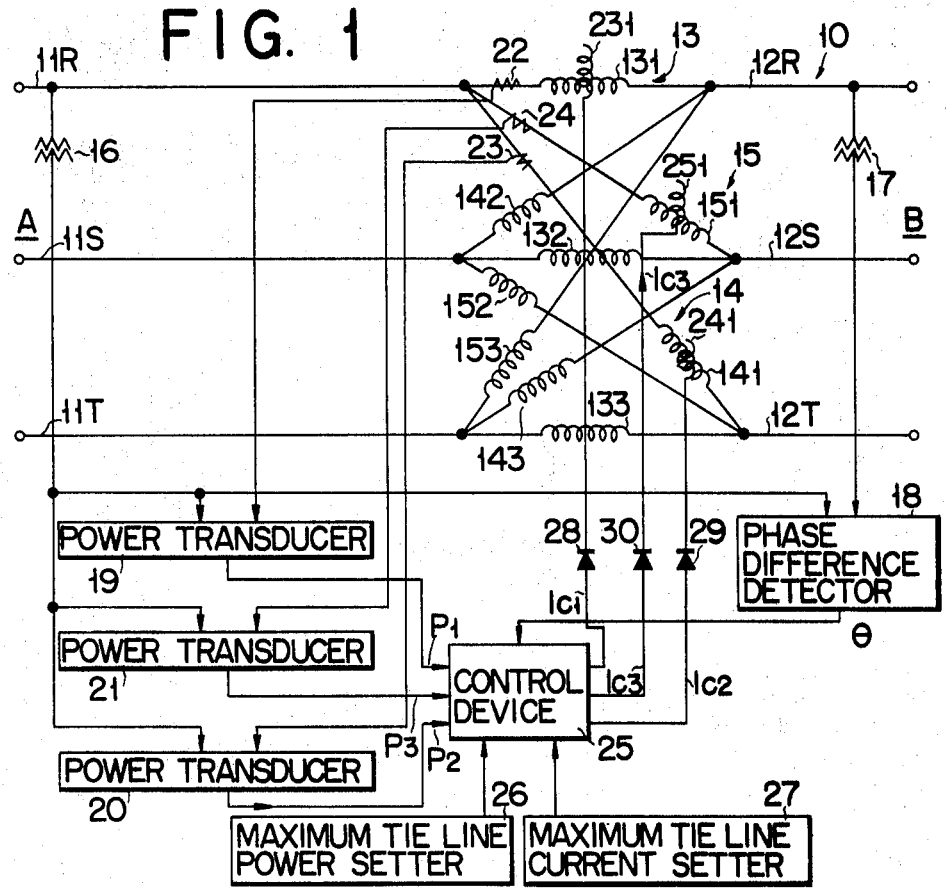
FIG. 1 is a circuit diagram of an embodiment of the present invention.

There will now be described an embodiment of the present invention by reference to the appended drawings, in which:

The A and B sides of FIG. 1 represent two power systems to be joined with a tie line 10 which includes tie lines 11R, 11S and 11T associated with one power system A and 12R, 12S and 12T associated with the other B. These three pairs of tie lines are connected, as shown, by three groups of DC excited saturable reactors, namely, 131, 132, 133, 141, 142, 143 and 151, 152, 153. The respective reactors 131, 132 and 133 of the first group 13 are interposed between the corresponding phase lines of said tie line, i.e., the three pairs of tie lines of 11R–12R. 11S–12S and 11T–12T. The respective reactors 141, 142 and 143 of the second group 14 connect the different phase lines of the tie line, i.e. the three sets of tie lines of 11R–12T, 11S–12R and 11T–12S. The respective reactors 151, 152 and 153 of the third group 15 connect the other different combinations of tie line phases, i.e. the three sets of tie lines of 11R–12S, 11S–12T and 11T–12R.

The tie line 11R is connected to a potential transformer 16, the tie line 12R to another potential transformer 17. The output terminals of said transformers 16 and 17 are connected to the input terminals of a phase difference detector 18. The output terminal of the potential transformer 16 is connected to the input terminals on one side of power transducers 19, 20 and 21 respectively. The current transformers 22, 23 and 24 are provided on the saturable reactors 131, 141, and 151 respectively to detect tie line current, the secondary terminals of which are connected to the input terminals on the other side of the aforesaid power transducers 19, 20 and 21 respectively.

The power transducers 19, 20 and 21 are so operated as to detect tie line powers $P_1$, $P_2$ and $P_3$ introduced through the saturable reactors 131, 141, and 151 respectively, thereby generating an output in the form of a direct voltage or current proportionate to the detected tie line powers $P_1$, $P_2$ and $P_3$. In the later description, however, the values of the tie line powers $P_1$, $P_2$ and $P_3$ are supposed to be directly taken out of said transducers as outputs. The output terminals of the power transducers 19, 20 and 21 are connected to the input terminal of a control device 25, the arrangement of which is further detailed in FIG. 3, said input terminal being supplied with said tie line powers $P_1$, $P_2$ and $P_3$ as inputs.

The output terminal of the phase difference detector is also connected to three relays (not shown) located in the control device 25 to allow the relays to be actuated in turn according to increases in the phase difference $\Theta$ between the power systems A and B. The first relay makes its normal open contacts $34_1$ and $34_2$ where said phase difference " is approximately 0 to 120° in electrical angle, the second relay makes its similar contacts $35_1$ and $35_2$ where $\Theta$ is approximately 120 to 240°, and the third makes its similar contacts $36_1$ and $36_2$ where $\Theta$ is approximately 240 to 360°. As described hereinafter, said respective groups of contacts have simultaneous closing time during their transfer operation.

The other input terminals of the control device 25 are supplied with outputs from a maximum tie line power setter 26 and maximum tie line current setter 27 in the form of, for example, a direct voltage. On the other hand, the output terminals of the control device 25 are connected to DC exciting windings 231, 241 and 251 formed on the saturable reactors 131, 141 and 151 through diodes 28, 29 and 30 of the indicated polarity so as to conduct the later described DC exciting currents $I_{c1}$, $I_{c2}$ and $I_{c3}$ to said DC exciting windings 231, 241 and 251.

FIG. 1 presents DC exciting windings 231, 241 and 251 formed only on those saturable reactors of the groups 13, 14 and 15 which are respectively associated with one included in the aforesaid various phases. Actually, however, there are provided such DC exciting windings similarly for other reactors such that the DC exciting windings of the individual groups are connected in series or parallel and excited simultaneously. All these DC exciting windings are selectively supplied with DC exciting currents $I_{c1}$ to $I_{c3}$ in a manner to correspond to the above-mentioned three groups of saturable reactors.

The control device 25 regulates the value of DC exciting currents $I_{c1}$, $I_{c2}$ and $I_{c3}$, so that the extent of saturation of reactors is so adjusted as to vary the impedance value of AC windings thereof, and in consequence the tie line power flowing therethrough can also be adjusted. A maximum value of the tie line power is limited to a predetermined value by comparing it with the values previously set by the maximum tie line power setter 26. The maximum tie line current flowing through the reactors is also limited by the maximum tie line current setter 27.

Figure 2:
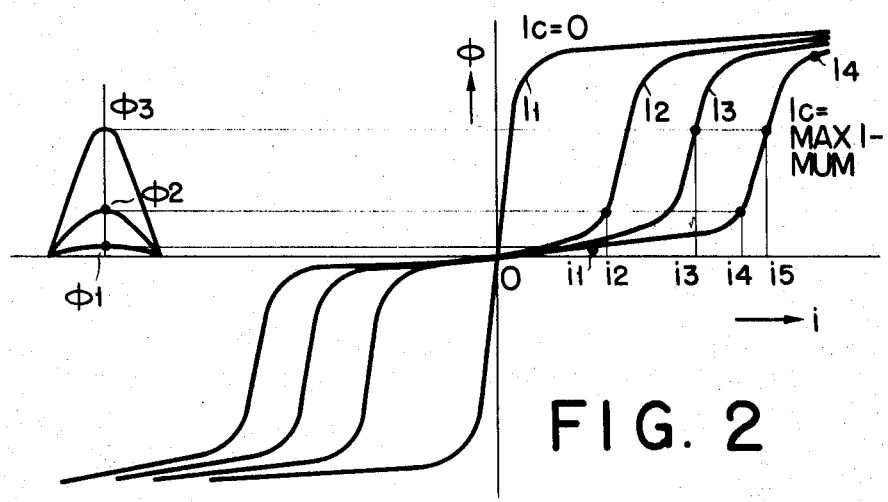
FIG. 2 is a curve diagram showing the properties of saturable reactors used in said embodiment.

In general, the relationship of the magnetic flux $\Phi$ in a reactor core to the tie line current $i$ flowing through a saturable reactor may be expressed as shown in the curve diagram of FIG. 2. The curve $l_1$ represents the property of a saturable reactor when it is not excited, namely, when the DC exciting current $I_c$ is zero. If the DC exciting current $I_c$ progressively increases the saturable reactor will display a property represented by the curves $l_2$ and $l_3$ in turn. Further where the DC exciting current $I_c$ has a maximum value, said property may be expressed by the curve $l_4$.

In the normal state where there is little phase difference between the power systems A and B, only the saturable reactors 131, 132 and 133 of the group 13 included in the saturable reactors having the aforementioned property are supplied with a DC exciting current to reduce impedance thereof, and those of the other groups 14 and 15 remain unexcited to hold high impedance thereof. Accordingly, the amount of current passing through said groups 14 and 15 of reactors is negligibly small as shown in FIG. 2. In such case, the control current to be introduced through the control windings of the respective saturable reactors of the group 13 is set at a full high level, or in a manner to have a property denoted by the curve $l_4$ of FIG. 2 according to the value previously set by the maximum tie line current setter 27. With respect to the curve $l_4$, where the saturable reactor has a magnetic flux $\Phi_1$ in normal power supply, the tie line current flowing therethrough will have a value $i_1$. And if there occurs a severe power shortage from considerably increased load or substantially no supply from a large power source in one power system which is supplied with a tie line power from the other, the tie line power will increase with tie line current. Where the increased tie line power is still smaller than a value reset by the line power setter 26, the DC excitation of reactors remains in the aforementioned state. To this end, the magnetic flux of the reactors increases from $\Phi_1$ to $\Phi_3$ corresponding to the increased tie line current $i_s$ and the tie line current is limited by the property defined by curve $l_4$. Where it is necessary to reduce limitation on tie line current, groups 13, 14 and 15 through three serially combined groups is achieved by reducing the value of DC exciting current to be introduced through the DC exciting winding formed on a given saturable reactor. Thus the form of the curve representing the property of the saturable reactor can be shifted from the indicated $l_4$ to $l_3$ or $l_2$, that is, reducing the maximum tie line current $i$ flowing through the tie line connecting both power systems, for example, from $i_5$ to $i_3$ or $i_4$ to $i_2$.

Figure 3:
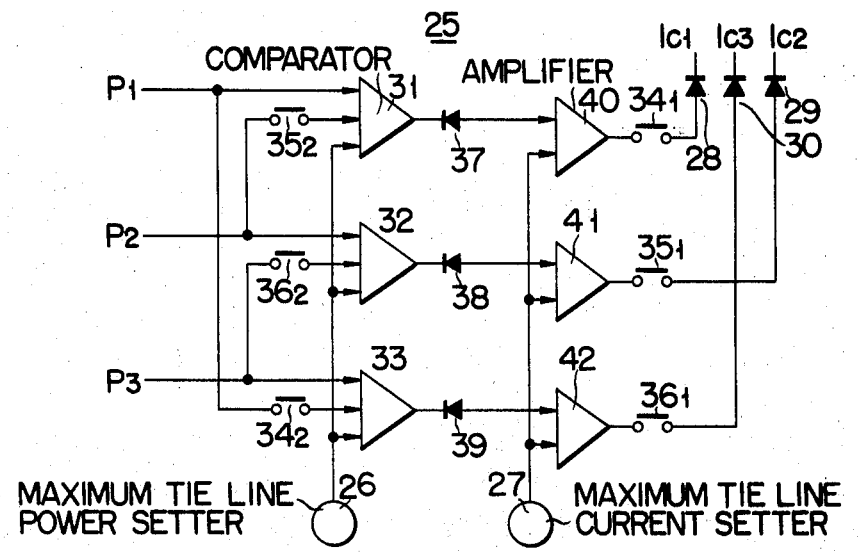
FIG. 3 is a block diagram of a control device involved in said embodiment.

FIG. 3 is a concrete block diagram of the subject control device 25. There will now be described the operation of said device by reference to FIG. 3. The first input terminals of voltage comparators 31, 32 and 33 are supplied with the tie line powers $P_1$, $P_2$ and $P_3$ from the power transducers 19, 20 and 21 respectively. The second input terminal of the voltage comparator 31 is supplied with the tie line power $P_2$ through a contact $35_1$, the second input terminal of the voltage comparator $35_2$, the second input terminal of the voltage comparator 32 with the tie line power $P_3$ through a contact $36_2$ and the second input terminal of the voltage comparator 33 with the tie line power $P_1$ through a contact $34_2$. The third input terminals of the voltage comparators 31, 32 and 33 are supplied with outputs from the maximum tie line power setter 26. The output terminals of the voltage comparators 31, 32 and 33 are connected to the input terminals on one side of the amplifiers 40, 41 and 42 through diodes 37, 38 and 39. The input terminals on the other side of the amplifiers 40, 41 and 42 are supplied with reference voltages for setting from the maximum tie line current setter 27. The output terminals of the amplifiers 40, 41 and 42 are connected to the DC exciting windings formed on the individual saturable reactors of the three groups 13, 14 and 15 through three serially combined groups of contact $34_1$—diode 28, contact $35_1$—diode 29 and contact $36_1$—diode 30 respectively.

Referring to the arrangement of FIG. 3, in normal power supply, there is little phase difference between the corresponding phase lines of the tie line, Since, in this case, the phase difference between both power systems A and B falls exactly within a range of 120°, the contacts $34_1$ and $34_2$ are closed, whereas the other groups of contacts of $35_1$–$35_2$ and $36_1$–$36_2$ remain open. Thus, only DC exciting current $I_{c1}$, an output from the amplifier 40, having a value previously set by the maximum tie line current setter 27 is supplied to the DC exciting winding 231 formed on the individual saturable reactors of the group 13.

Accordingly, the individual reactors in group 13 are so fully saturated as to allow a sufficient tie line power to be transferred therethrough. However, when there occurs either a large power shortage or no supply from a relatively large power source in one of the power systems, the value of the tie line power transferred from the other power system to the first mentioned system further increases exactly to such extent. This is likely to cause a step out between both power systems, leading to increased phase difference between the corresponding tie lines. Where the phase difference between both power systems A and B exceeds over 120°, the other contacts $35_1$ and $35_2$ are closed by the detector 18 and contacts $34_1$, and $34_2$ are opened after a predetermined delay. Thus the individual reactors of the second group 14 become saturable instead of the first group 13, and tie line current flows, for example, from tie line 11R to tie line 12T, from 11S to 12R and from 11T to 12S. Accordingly, the tie line power is transferred across other phase lines having a small phase difference therebetween to reduce reactive power to be expended in reactors. Similarly, the contacts $36_1$ and $36_2$ are closed, when said phase difference falls within a range of 240 to 360°, instead of contacts $35_1$ and $35_2$.

The first input terminals of the voltage comparators 31, 32 and 33 are supplied with the tie line powers $P_1$, $P_2$ and $P_3$ from the power transducers 19, 20 and 21. As mentioned above where the phase difference is broadened and the tie line power increases over a predetermined value, then there is made a comparison between the increased tie line powers $P_1$, $P_2$ and $P_3$ and the DC voltages supplied to the third input terminals of said comparators which were previously set by the maximum tie line power setter 26. Where the values of the tie line powers $P_1$, $P_2$ and $P_3$ increase over the set values, then there are issued from the comparators 31, 32 and 33 output voltages proportionate to the differences arrive at by subtracting the set values from the tie line powers $P_1$, $P_2$ and $P_3$. These output voltages are supplied to the input terminals on one side of the amplifiers 40, 41 and 42 through the diodes 37, 38 and 39 and compared with the value set by the maximum tie line current setter 27. Thus outputs from the amplifiers 40, 41 and 42 decrease the exciting current $I_{c1}$ according to said output voltages. This means that if the DC exciting current $I_{c1}$ displays a property denoted by the curve $l_4$, as shown in FIG. 2, where the magnetic flux increases from $\Phi_1$ to $\Phi_2$ due to increased tie line power, then the load current produced at that time will have a value of $i_4$, a substantial increase over the load current $i_1$ in normal power supply. If, however, the DC exciting current $I_{c1}$ is so reduced as to have a property represented, for example, by the curve $l_2$ according to the output voltage, then, the load current running at that time will stand at a value of $i_2$.

As described above, depending on the state of the power system, the phase difference detected by the detector 18 may sometimes exceed 120°. In such case the contacts $35_1$ and $35_2$ are closed. However, just at the moment the phase difference rises over 120°, the tie line power passing through the reactors of the group 14 is so small that it does not reach the upper limit set by the maximum tie line power setter 26 and consequently is obstructed by the diode 38, allowing no output to be issued from the voltage comparator 32. Accordingly, there is supplied from the amplifier 41 a sufficiently large DC exciting current to match the value set by the maximum tie line current setter 27 as a DC exciting current $I_{c2}$ to the DC exciting windings of the respective saturable reactors of the group 14 through the diode 29. The saturable reactors of the group 14 will have a property represented by the curve $l_4$ of FIG. 2 and their reactance will be fully decreased, thus allowing the tie line power $P_1$ to be controlled by $P_2$ obtained from the power transducer 20.

Figure 4:
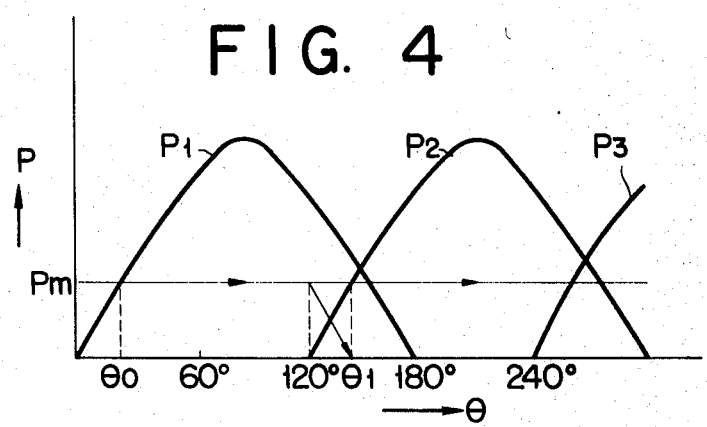
FIG. 4 shows wave forms illustrative of the operation of said embodiment.

There will now be described by reference to FIG. 4 the manner in which the tie line power is shifted from $P_1$ to $P_2$. As shown in FIG. 4, when the phase difference reaches $\Theta_0$, becomes equal to the maximum vale PM set by the maximum tie line power setter 26 and then further increases, then there is generated, as described above, an output from the voltage comparator 31 according to the difference between the tie line power $P_1$ and maximum set value PM. Thus the tie line power $P_1$, restricted by the maximum set value PM, passes through the saturable reactors 131, 132 and 133 of the group 13. When the phase difference is broadened to 120°, the contacts $35_1$ and $35_2$ are closed and the DC exciting current $I_{c1}$ is introduced through the DC windings 241 formed on the saturable reactors of the group 14, allowing the tie line power $P_2$ to begin running through said reactors of the group 14. At this time the voltage comparator 31 which received the tie line power $P_1$ as an input is additionally supplied with the tie line power $P_2$ due to the closing of the contact 35 to control a sum of $P_1$ and $P_2$ in a manner to make it equal to the value PM set by the maximum tie line power setter 26. Namely, the tie line power is reduced to a value equal to a difference arrived at by subtracting the tie line power $P_2$ from the aforesaid set value PM. Thus $P_1$ decreases according as $P_2$ increases, so that when the phase difference reaches $\Theta_1$ as shown in FIG. 4, the tie line power $P_1$ becomes zero and is fully shifted to the reactors of the group 14 and runs therethrough. At this moment the contacts $34_1$ and $34_2$ are opened. Said tie line power $P_2$ which flows through the aforesaid reactors of the group 14 is also restricted, as described above, by the maximum set value PM and supplied in the constant form. When the phase difference is further broadened to 240° the contacts $36_1$ and $36_2$ are closed, allowing the tie line power to be similarly shifted from the group 14 to the group 15 of reactors. When the phase difference rises to 360° the tie line power runs back to the group 13 from group 15. The aforesaid operation is repeated hereinafter, enabling a constant power to be supplied unfailingly even in case of failure.

As mentioned above, the present invention controls a specified group of saturable reactors to low impedance in normal power supply, presenting no problem with the time line power and, when the stepout of one power system results from considerably increased load or no supply from a large power source, adjusts the maximum tie line current setter, thereby automatically restricting the magnitude of current from one power system to the other by a freely set value. When the phase difference defined by both power systems is further broadened with the resultant increase in backup power supply, the maximum amount of said supply can be restricted by the value previously set by the maximum tie line power setter, preventing said supply from becoming unduly large. Further when the phase difference increases over 120° each group of reactors is selectively operated in turn according to the magnitude of said phase difference to allow a constant power to be supplied at all times. Accordingly even when the power system steps out there can be supplied a constant power all the same. Further, according to this invention when the tie line power is supplied from the first group of reactors to the other, that is, the second group or the third, said supply is made continuously, thereby prominently elevating the transient overall stability of the power systems.

It will be apparent that the present invention is not limited to the embodiments described and illustrated, but it is intended to cover all modifications falling within the spirit and scope of this invention.

We claim:
1. An interconnecting means for electric power systems comprising a plurality of groups of saturable reactors connecting the corresponding, as well as different, phase of a tie line interposed between two power systems respectively, a detector for detecting the tie line power introduced through said variable reactors, a phase difference detector for detecting the phase difference defined by both power systems and a control device for selectively determining the operating condition of said groups of saturable reactors with outputs from said tie line power detector and phase difference detector and controlling the reactance of said variable reactors, thereby controlling the value of a tie line power introduced across said two systems.

2. An interconnecting means according to claim 1 wherein said variable reactors are DC excited saturable ones.

3. An interconnecting means according to claim 1 wherein said tie line power detector is supplied with inputs from the potential transformers connected to said tie lines and those from the current transformers connected to a circuit comprising said variable reactors and detects said tie line power in the form of an electric quantity proportionate to said tie line power.

4. An interconnecting means according to claim 1 wherein said control device for controlling the tie line power by supplying said variable reactors with control power comprises a maximum tie line power setter for setting the maximum value of a tie line power passing through said variable reactors in a manner to restrict it; a comparator provided for each phase for comparing first outputs detected by the tie line power detector with second outputs from the maximum tie line power setter and generating third outputs having a magnitude proportionate to the difference between said first outputs and the value previously set by said maximum tie line power setter; a maximum tie line current setter for setting the maximum value of tie line current in a manner to restrict the reactance of said variable reactors and supply them with a maximum DC exciting current in the normal operation of said power systems; an amplifier provided for each phase for comparing the third outputs from said voltage comparators with the fourth outputs from said maximum tie line current setter, thereby adjusting said DC exciting current according to said third outputs; and a contact means controlled according to the phase difference detected by said phase difference detector for supplying only the prescribed ones involved in said plurality of groups of variable reactors with a DC exciting current for their selective operation.